(12) United States Patent
Kim

(10) Patent No.: US 7,658,532 B2
(45) Date of Patent: Feb. 9, 2010

(54) PORTABLE DISPLAY DEVICE

(75) Inventor: Jung Hoon Kim, Suwon-si (KR)

(73) Assignee: Samsung Mobile Display Co., Ltd., Gyeonggi-do (KR)

( * ) Notice: Subject to any disclaimer, the term of this patent is extended or adjusted under 35 U.S.C. 154(b) by 206 days.

(21) Appl. No.: 11/819,020

(22) Filed: Jun. 25, 2007

(65) Prior Publication Data
US 2008/0112116 A1   May 15, 2008

(30) Foreign Application Priority Data
Nov. 9, 2006   (KR) ................ 10-2006-0110570

(51) Int. Cl.
*F21V 7/04* (2006.01)
(52) U.S. Cl. .......... 362/632; 362/294; 362/600; 362/612
(58) Field of Classification Search ........ 362/632, 362/633, 611, 612, 561, 294, 373; 349/58, 349/161
See application file for complete search history.

(56) References Cited

U.S. PATENT DOCUMENTS

| | | | | |
|---|---|---|---|---|
| 5,831,374 A * | 11/1998 | Morita et al. | ........ | 313/46 |
| 6,992,736 B2 | 1/2006 | Saito et al. | | |
| 7,261,434 B2 * | 8/2007 | Miyamoto | ........ | 362/218 |
| 7,342,792 B2 * | 3/2008 | Kim et al. | ........ | 361/704 |
| 7,481,567 B2 * | 1/2009 | Cho et al. | ........ | 362/632 |
| 2004/0032725 A1 * | 2/2004 | Hsieh et al. | ........ | 362/31 |
| 2005/0088586 A1 | 4/2005 | Mori et al. | | |
| 2006/0070280 A1 | 4/2006 | Yamamura et al. | | |
| 2006/0082271 A1 | 4/2006 | Lee et al. | | |
| 2006/0098457 A1 * | 5/2006 | Chen et al. | ........ | 362/632 |
| 2006/0104067 A1 * | 5/2006 | Hwang et al. | ........ | 362/373 |
| 2006/0274223 A1 | 12/2006 | Hsu | | |

FOREIGN PATENT DOCUMENTS

| | | |
|---|---|---|
| CN | 1 873 492 A | 12/2006 |
| JP | 56-136824 | 10/1981 |
| JP | 57-156823 | 9/1982 |
| JP | 10-078512 A | 3/1998 |
| JP | 2003-215546 A | 7/2003 |
| JP | 2005-077757 A | 3/2005 |
| JP | 2005-134422 A | 5/2005 |
| JP | 2006-023654 A | 1/2006 |
| JP | 2006-208722 A | 8/2006 |
| JP | 2006-235093 A | 9/2006 |
| JP | 2006-293182 A | 10/2006 |
| KR | 10-2005-0073999 A | 7/2005 |

* cited by examiner

*Primary Examiner*—Ali Alavi
(74) *Attorney, Agent, or Firm*—Lee & Morse P.C.

(57) ABSTRACT

A portable display device includes a display panel, a light source supplying light to the display panel, a mold frame supporting the display panel and surrounding at least two sides of the light source, and a relief unit between the mold frame and the light source.

16 Claims, 4 Drawing Sheets

PORTABLE DISPLAY DEVICE

BACKGROUND OF THE INVENTION

1. Field of the Invention

The present invention relates to a portable display device. More particularly, the present invention relates to a portable display device having a structure capable of preventing excessive temperature rise of a light source of the portable display.

2. Description of the Related Art

In general, conventional flat panel display (FPD) devices, such as liquid crystal displays (LCDs), field emission displays (FEDs), plasma display panels (PDPs), and light emitting displays (LED), may have a reduced weight and volume and low power consumption, as compared to a cathode ray tube (CRT) display device. Accordingly, flat panel displays may be more readily employed in portable display devices, such as cellular phones, portable digital assistants (PDAs), portable TVs, and so forth.

A conventional portable display device may include a non-emissive display panel, e.g., a liquid crystal display (LCD). A conventional LCD may include a LCD panel, a backlight assembly with a light source, a light guide plate, and a mold frame for supporting the light source. Both the light guide plate and the mold frame may prevent light leakage.

However, conventional formation of the light guide plate and the mold frame around the light source may inhibit sufficient dissipation of heat generated by the light source and, thereby, trigger excessive temperature increase of the light source. An increased temperature of the light source may overheat elements positioned adjacent to the light source, e.g., portions of the LCD panel, circuits for driving the LCD panel, circuit components of the light source, and so forth, and thereby, cause deterioration of the adjacent elements.

Accordingly, there exists a need for a portable display device having a structure capable of maintaining an ambient temperature of the light source or minimizing a temperature increase thereof.

SUMMARY OF THE INVENTION

The present invention is therefore directed to a portable display device, which substantially overcomes one or more of the disadvantages of the related art.

It is therefore a feature of the present invention to provide a portable display device capable of preventing temperature rise of a light source in a display device.

At least one of the above and other features and advantages of the present invention may be realized by providing a portable display device, including a display panel, a light source supplying light to the display panel, a mold frame supporting the display panel and surrounding at least two sides of the light source, and a relief unit between the mold frame and the light source.

The relief unit may be in an inner side of the mold frame. The relief unit may include at least one projection extending from the mold frame toward the light source. The relief unit may include a plurality of asymmetrical shapes. The relief unit may include a plurality of rectangular ridges. Alternatively, the relief unit may include a plurality of triangular ridges. In yet another alternative, the relief unit may include a plurality of longitudinal ridges having rounded edges. The rounded edges of the longitudinal ridges may be semi-circles directly across from the light source.

The portable display device may further include a light guide plate adjacent to one side of the light source. The light guide plate may be at least as thick as the light source. The mold frame may surround all sides of the light source not adjacent to the light guide plate. The relief structure may be on each side of the mold frame surrounding the light source.

The relief structure may be spaced apart from the light source. The relief structure may have a surface area larger than a surface area of the mold frame facing the light source. The light source may be a light-emitting diode. The display panel may be a liquid crystal display. The mold frame may be facing the light source.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
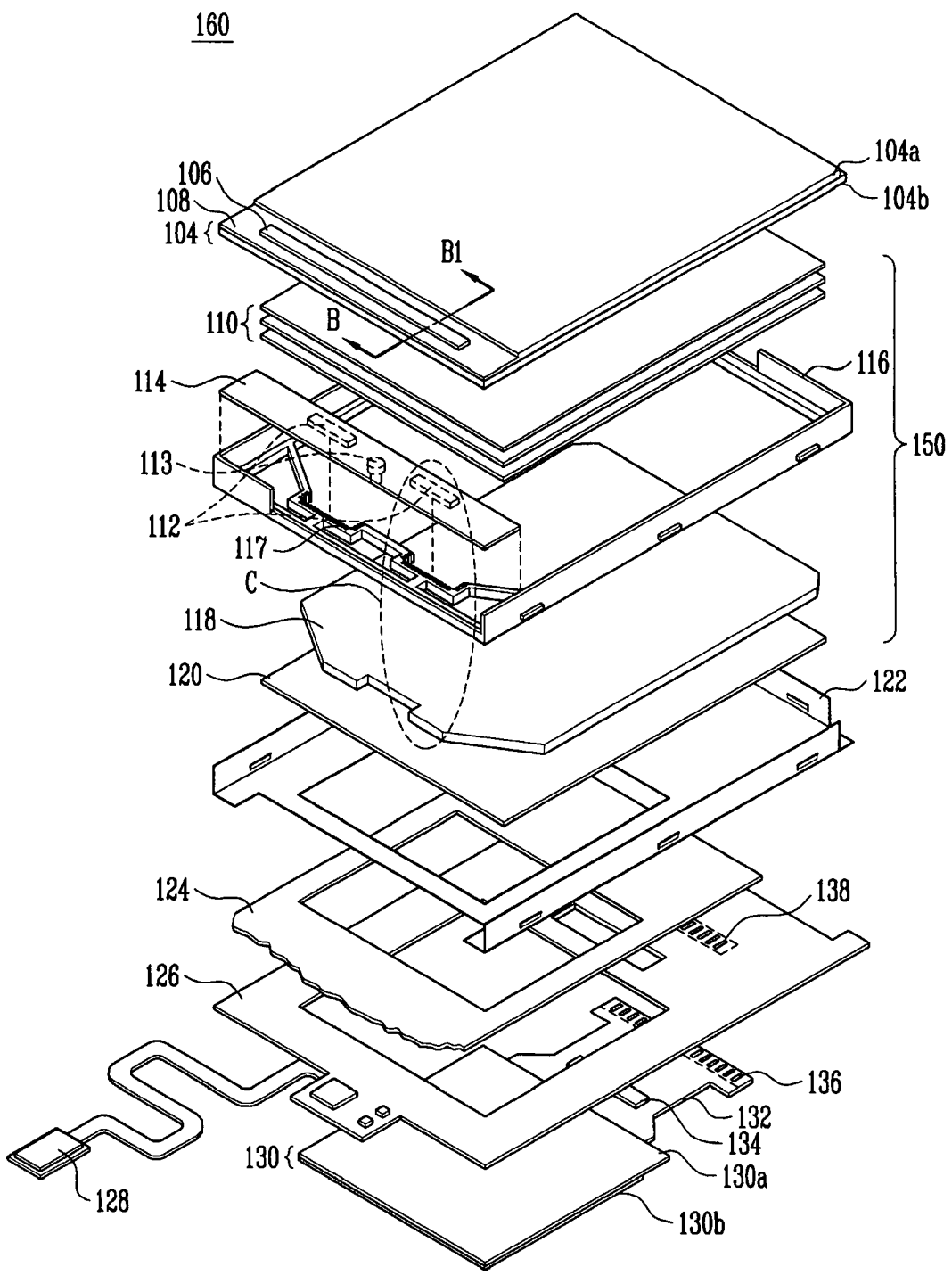
FIG. 1 illustrates an exploded perspective view of a portable display device according to an embodiment of the present invention.

Korean Patent Application No. 10-2006-0110570, filed on Nov. 9, 2006, in the Korean Intellectual Property Office, and entitled: "Portable Display Device," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers or elements may also be present. Further, it will be understood that when a layer or element is referred to as being "under" another layer or element, it can be directly under, or one or more intervening layers or elements may also be present. In addition, it will also be understood that when a layer or element is referred to as being "between" two layers or elements, it can be the only layer or element between the two layers or elements, or one or more intervening layers or elements may also be present. Like reference numerals refer to like elements throughout.

Hereinafter, an exemplary embodiment of a portable display device according to the present invention will be described in more detail below with reference to FIGS. 1-4. In this respect, it should be noted that even though FIGS. 1-4 illustrate a dual display device having at least one liquid crystal display (LCD) device and used in a cellular phone, other types of portable display devices are not excluded from the scope of the present invention. It should further be noted that a light-emitting diode substrate is not illustrated in FIG. 3 for convenience purposes only.

As illustrated in FIGS. 1-4, a portable display device 160 according to an embodiment of the present invention may include a LCD panel 104, a backlight assembly 150, a bottom chassis 122, first and second printed circuit boards 124 and 126, and a light-emitting display panel 130.

The LCD panel 104 may be a front-most panel in the portable display device 160, i.e., a panel displaying a predetermined image. The LCD panel 104 may include a first substrate 104a, a second substrate 104b, and a crystal (not shown) injected therebetween. The LCD panel 104 may further include upper and lower polarizing plates (not shown).

The second substrate 104b may include a plurality of thin film transistors ("TFT") disposed in a matrix shape, while each TFT may have a source electrode connected to a data line, a gate electrode connected to a scan line, and a drain electrode connected to a pixel electrode made of a transparent conductive material, e.g., ITO. Accordingly, when scan signals are supplied to the scan line, the TFT may be turned on to transfer data signals supplied from the data line to the pixel electrode. The scan and data signals may be supplied from an integrated circuit 106 coated with a protective layer 108 and inserted in the second substrate 104b.

The first substrate 104a of the LCD panel 104 may be positioned in parallel to the second substrate 104b. A common electrode made of, e.g., ITO, may be applied to a front side of the first substrate 104a, so that a predetermined voltage applied to the common electrode may form a predetermined electric field between the common electrode and the pixel electrode. Accordingly, an angle of the liquid crystal injected between the first and second substrates 104a and 104b may be modified with respect to the electric field in order to alter light transmittance through the crystal to form images.

The backlight assembly 150 of the portable display device 160 according to an embodiment of the present invention may provide light to the LCD panel 104. More specifically, the backlight assembly 150 may include a plurality of light-emitting diodes 112, a light-emitting diode substrate 114, a light guide plate 118, a reflecting plate 120, optical sheets 110, and a mold frame 116.

The plurality of light-emitting diodes 112 of the backlight assembly 150 may function as the light source of the LCD panel 104 and generate light with a predetermined brightness with respect to driving signals received from the light-emitting diode substrate 114. The light-emitting diodes 112 may be mounted on the light-emitting diode substrate 114 in a chip shape, so that the light-emitting diodes 112 may be positioned between the light-emitting diode substrate 114 and the LCD panel 104.

The light-emitting diode substrate 114 of the backlight assembly 150 according to an embodiment of the present invention may be placed in a portion of the mold frame 116 and may be electrically connected to the first printed circuit board (PCB) 124. The light-emitting diode substrate 114 may be positioned between the mold plate 116 and the light-emitting diodes 112, so that the light-emitting diodes 112 and at least one circuit component 113 may be mounted on an upper surface thereof. Accordingly, the light-emitting diode substrate 114 may receive control signals from the first PCB 124, and may transmit respective driving signals to the light-emitting diodes 112 via the at least one circuit component 113.

The light guide plate 118 of the backlight assembly 150 according to an embodiment of the present invention may facilitate transmittance of light from the light-emitting diodes 112 to the LCD panel 104. In other words, the light guide plate 118 may be adjacent to the light-emitting diodes 112, so light supplied from outer edges the light guide plate 118 may be transmitted to the LCD panel 104 positioned above the light guide plate 118. Accordingly, a thickness of outer edges of the light guide plate 118 may be at least as thick as a thickness of outer edges of the light-emitting diode 112 to prevent light leakage and occurrence of hot-spot. An overall thickness of the light guide plate 118 may be higher than a thickness of other components of the backlight assembly 150, e.g., optical sheets 110.

The reflecting plate 120 of the backlight assembly 150 according to an embodiment of the present invention may be positioned between the light guide plate 118 and the chassis base 122, so that light incident from the light guide plate 118 may be reflected by the reflecting plate 120 back toward the light guide plate 118 in order to improve light efficiency.

The optical sheets 110 of the backlight assembly 150 according to an embodiment of the present invention may improve brightness of the light supplied from the light guide plate 118 to the LCD panel 104.

Figure 3:
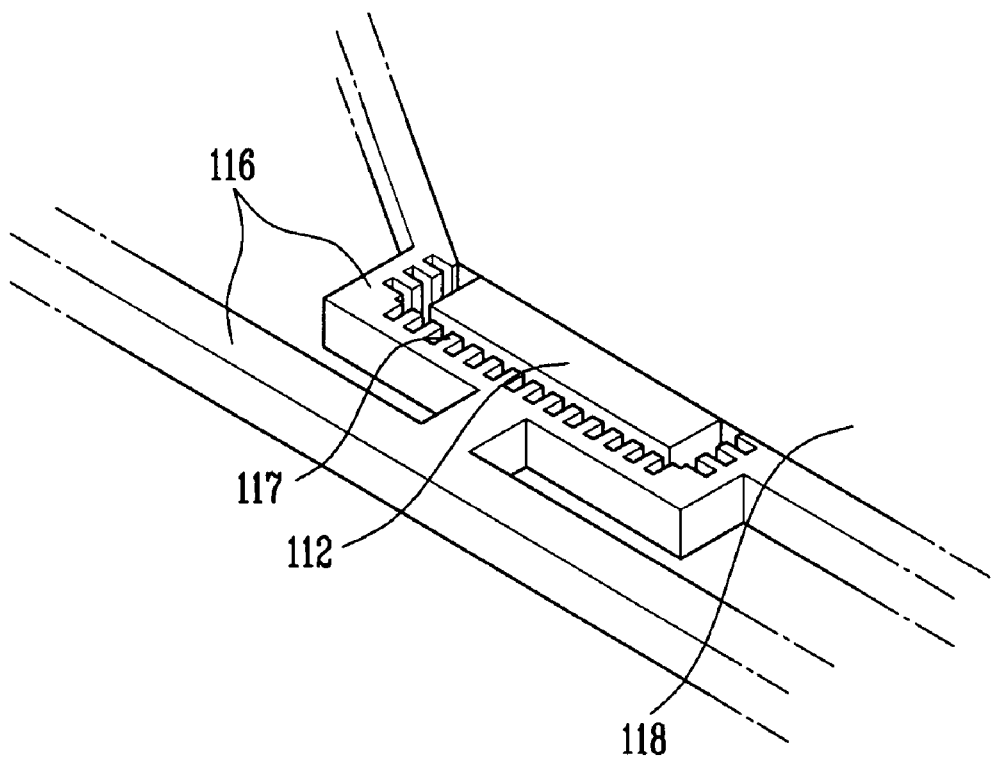
FIG. 3 illustrates an assembled enlarged perspective view of part C illustrated in FIG. 1.

The mold frame 116 of the backlight assembly 150 according to an embodiment of the present invention may support the LCD panel 104 and the backlight assembly 150. In particular, as illustrated in FIG. 3, the backlight assembly 150 may fit into an upper portion of the mold frame 116, so that the plurality of light-emitting diodes 112 of the backlight assembly 150 may be surrounded by the mold frame 116. More specifically, the mold frame 116 may be structured to have predetermined framing portions, so that at least two outer sides of each light-emitting diode 112, i.e., sides not adjacent to the light guide plate 118, may be surrounded by the mold frame 116. In other words, the framing portions of the mold frame 116 may provide a border-type structure around at least two outer sides of each light-emitting diode 112 in order to prevent light leakage, as further illustrated in FIG. 3.

Figure 2:
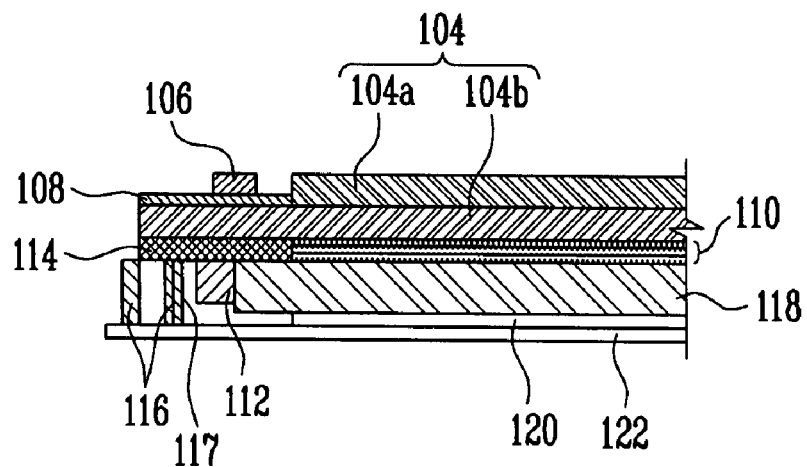
FIG. 2 illustrates a partial cross-sectional view of an assembled liquid crystal display panel, a backlight assembly, and a bottom chassis taken along line B-B' illustrated in FIG. 1.

The mold frame 116 may include a relief unit 117 in portions corresponding to the framing portions of the mold frame 116. More specifically, inner sides of portions of the mold frame 116 surrounding each of the light-emitting diodes 112 may be formed in a relief pattern to form a relief unit 117, as illustrated in FIGS. 2-3. The relief unit 117 may increase a surface area of the mold frame 116, i.e., the relief unit 117 may have a larger surface area as compared to the mold frame 116 having no relief pattern. Accordingly, the area between the light-emitting diode 112 and the mold frame 116 may be increased, so that an amount of air therein may be sufficiently enhanced to remove excess heat generated by the light-emitting diodes 112. In other words, the enhanced amount of air between the light-emitting diode 112 and the mold frame 116 may increase the rate of heat transfer therebetween, and thereby, improve heat removal from the light-emitting diode 112. Accordingly, even when the light-emitting diode 112 generates relative large amounts of heat upon light emission, an excessive temperature increase above an ambient temperature thereof may be substantially minimized, so that deterioration of elements positioned adjacent to the light-emitting diode 112, e.g., portions of the LCD 104, the integrated circuit 106, and so forth, as can be seen in FIG. 3, may be reduced.

Figure 4:
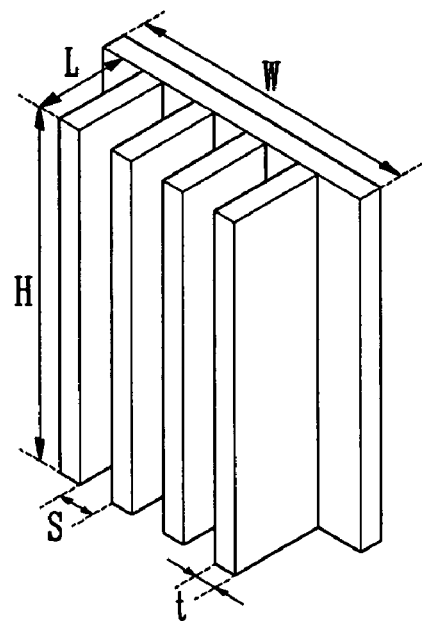
FIG. 4 illustrates a partial view of a relief pattern in a relief unit illustrated in FIGS. 2 and 3.

The relief unit 117 may be shaped in any convenient relief pattern as determined by one of ordinary skill in the art. For example, the relief unit 117 may include a plurality of consecutive rectangular ridges having openings therebetween, as illustrated in FIGS. 2 and 4. Adjustment of the shape and size of each ridge, in addition to the distance between every two ridges, may facilitate control of the heat transfer rate. More specifically, the heat transfer rate due to air convection may be proportional to a length (L) and a height (H) of each ridge, as well as a width (W) on which the relief unit 117 is formed, as illustrated in FIG. 4. It is further noted that the heat transfer rate may be in inverse proportion to a distance (S) between every two ridges and a sum of thicknesses (t) of the ridges. Accordingly, as a surface area between the relief unit 117 and air increases, the heat transfer rate increases. It should be noted, however, that if the ridges are formed in excessively close proximity to one another, even though the surface area of the relief unit 117 may be increased, the close proximity of the ridges may increase the resistance to air flow therebetween and, thereby, potentially reduce the heat transfer coefficient. Therefore, both the surface area of the relief unit 117 and the heat transfer coefficient may preferably be considered when designing the relief unit 117.

The bottom chassis 122 of the portable display device 160 according to an embodiment of the present invention may be fixed to the mold frame 116 with the LCD panel 104 and the backlight assembly 150, as further illustrated in FIG. 1. The bottom chassis 122 may include an opening portion for insertion of the light-emitting display panel 130.

The second printed circuit board 126 of the portable display device 160 according to an embodiment of the present invention may receive driving signals from a driving circuit of a portable device, e.g., a cellular phone, via a first connector 128. The first connector 128 may be in communication with a second connector attached to the driving circuit of the portable device to facilitate transfer of the driving signals. The second printed circuit board 126 may generate control signals in response to the received driving signals.

The first printed circuit board 124 of the portable display device 160 according to an embodiment of the present invention may be connected to the second printed circuit board 126 through a first pad unit 138 of the second printed circuit board 126. The first printed circuit board 124 may be further connected to the integrated circuit 106 of the light-emitting diode substrate 114 via a flexible PCB (not shown) to transmit thereto control signals from the second printed circuit board 126.

The light-emitting display panel 130 of the portable display device 160 according to an embodiment of the present invention may include a first substrate 130a and a second substrate 130b, as further illustrated in FIG. 1. A plurality of organic light-emitting diodes (OLEDs) (not shown) arranged in a matrix pattern may be disposed on the first substrate 130a. The OLEDs of the light-emitting display panel 130 may generate light with a predetermined brightness with respect to the current supplied thereto. Accordingly, the light-emitting display panel 130 may be connected to the second printed circuit board 126 via a second pad unit 136 of a flexible printed circuit board 132, so that an integrated circuit 134 mounted on the flexible printed circuit board 132 may receive control signals from the second printed circuit board 126 to transmit display signals to the light-emitting display panel 130.

Figure 5:
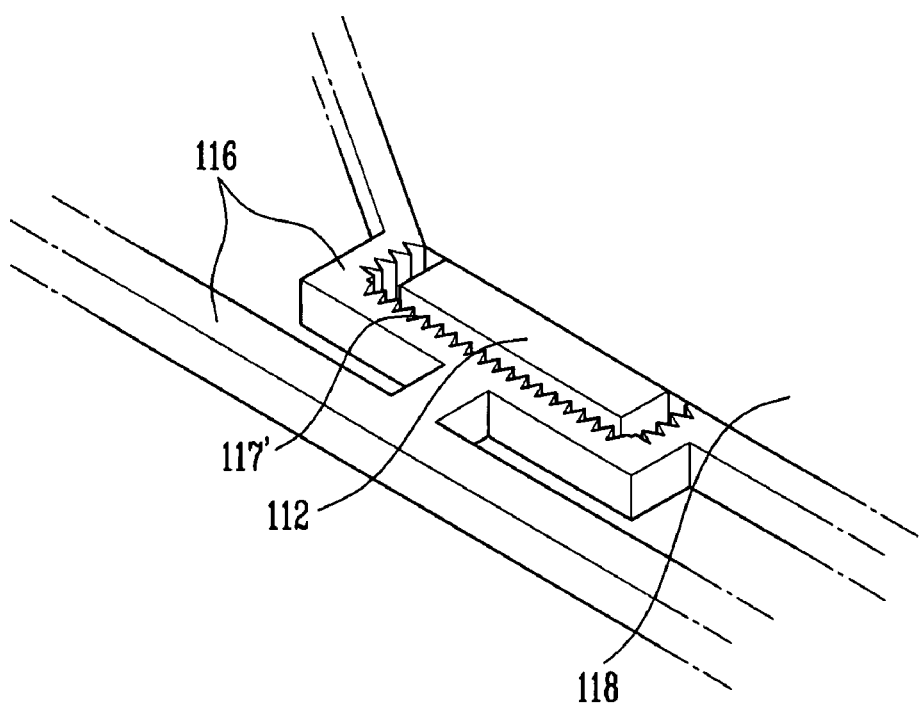
FIG. 5 illustrates an assembled partial perspective view of a relief pattern in a relief unit according to another embodiment of the present invention.

According to another embodiment of the present invention illustrated in FIG. 5, a portable display device may be similar to the portable display device 160 described previously with respect to FIGS. 1-4 with the exception of having a relief unit 117' with a different relief pattern structure. More specifically, the relief unit 117' may include a plurality of consecutive triangular ridges having triangular openings therebetween, as illustrated in FIG. 5.

Figure 6:
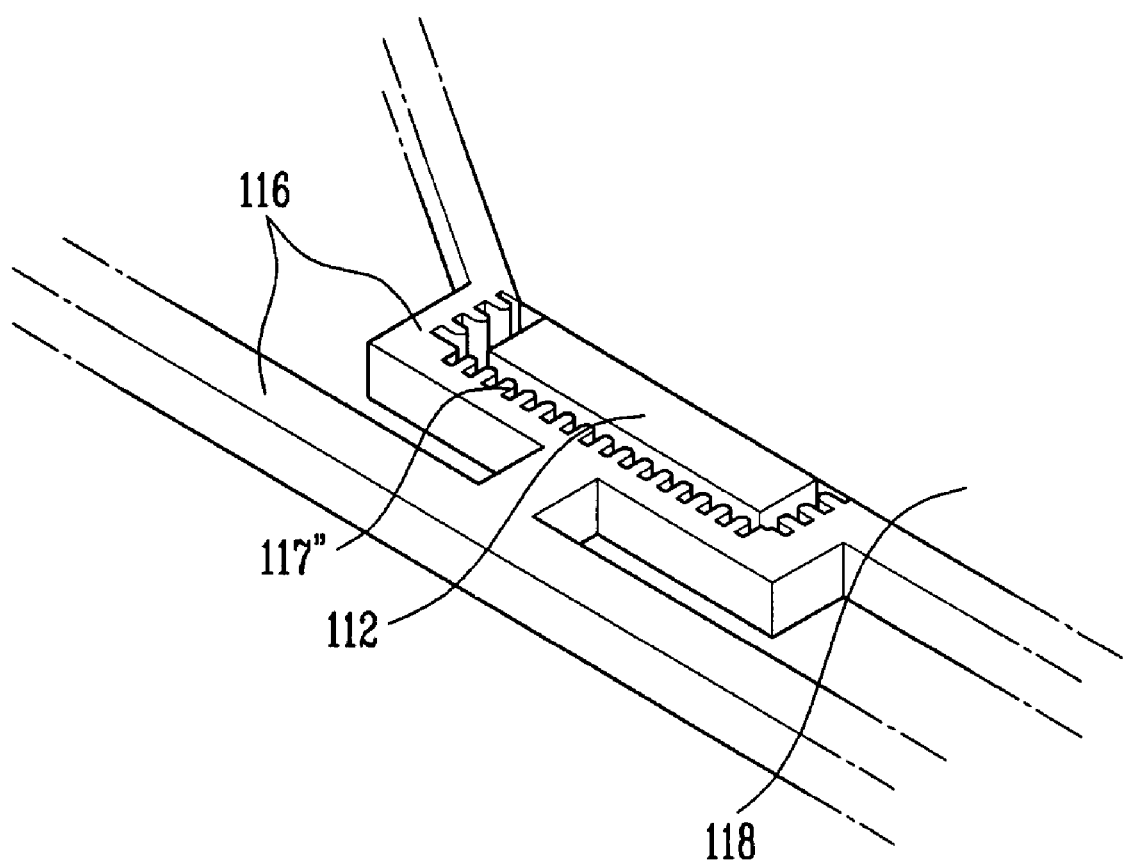
FIG. 6 illustrates an assembled partial perspective view of a relief pattern in a relief unit according to another embodiment of the present invention.

According to yet another embodiment of the present invention illustrated in FIG. 6, a portable display device may be similar to the portable display device 160 described previously with respect to FIGS. 1-4 with the exception of having a relief unit 117" with a different relief pattern structure. More specifically, the relief unit 117" may include a plurality of consecutive irregularly shaped ridges, as illustrated in FIG. 6. The irregularly shaped ridges of the relief unit 117" may include longitudinal projections having rounded edges, i.e., a half-circle shape facing the light-emitting diode 112. However, other structures of the relief unit 117", e.g., asymmetrical and/or discontinuous patterns, are not excluded from the scope of the present invention. For example, a single protruding projection having a plurality of faces may be formed as a relief structure on the mold frame 116 in order to increase a surface area thereof.

Formation of a relief unit in a mold frame of a display device according to an embodiment of the present invention is advantageous in providing an increased contact area between a light source of a non-emissive display, e.g., LCD, and a mold frame thereof, so that an ambient temperature of the light source, e.g., a light-emitting diode, may be maintained or prevented from an excessive increase, thereby minimizing deterioration of elements positioned adjacent to the light source. The excess heat generated by the light source may be removed by increasing a rate of heat transfer via an increase of the contact area between the source of heat, i.e., light-emitting diode, and the mold frame.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A portable display device, comprising:
   a display panel;
   a light source supplying light to the display panel;
   a mold frame supporting the display panel and surrounding at least two sides of the light source; and
   a relief unit between the mold frame and the light source, wherein the relief structure has a surface area larger than a surface area of the mold frame facing the light source.

2. The portable display device as claimed in claim 1, wherein the relief unit is in an inner side of the mold frame.

3. The portable display device as claimed in claim 1, wherein the relief unit includes at least one projection extending from the mold frame toward the light source.

4. The portable display device as claimed in claim 3, wherein the relief unit includes a plurality of rectangular ridges.

5. The portable display device as claimed in claim 1, wherein the relief unit includes a plurality of triangular ridges.

6. The portable display device as claimed in claim 1, wherein the relief unit includes a plurality of longitudinal ridges having rounded edges.

7. The portable display device as claimed in claim 6, wherein the rounded edges are semi-circles directly across from the light source.

8. The portable display device as claimed in claim 1, wherein the relief structure includes a plurality of asymmetrical shapes.

9. The portable display device as claimed in claim 1, further comprising a light guide plate adjacent to one side of the light source.

10. The portable display device as claimed in claim 9, wherein the light guide plate is at least as thick as the light source.

11. The portable display device as claimed in claim 9, wherein the mold frame surrounds all sides of the light source not adjacent to the light guide plate.

12. The portable display device as claimed in claim 11, wherein the relief structure is on each side of the mold frame surrounding the light source.

13. The portable display device as claimed in claim 1, wherein the relief structure is spaced apart from the light source.

14. The portable display device as claimed in claim 1, wherein the light source is a light-emitting diode.

15. The portable display device as claimed in claim 1, wherein the display panel is a liquid crystal display.

16. The portable display device as claimed in claim 1, wherein the mold frame is facing the light source.

* * * * *